United States Patent
Yamamoto

(10) Patent No.: US 7,443,428 B2
(45) Date of Patent: Oct. 28, 2008

(54) IMAGE PROCESSING DEVICE

(75) Inventor: Yasuhiro Yamamoto, Tokyo (JP)

(73) Assignee: Hoya Corporation, Tokyo (JP)

(*) Notice: Subject to any disclaimer, the term of this patent is extended or adjusted under 35 U.S.C. 154(b) by 671 days.

(21) Appl. No.: 11/169,917

(22) Filed: Jun. 30, 2005

(65) Prior Publication Data
US 2006/0001929 A1    Jan. 5, 2006

(30) Foreign Application Priority Data
Jul. 1, 2004    (JP) .................... P2004-195178

(51) Int. Cl.
H04N 5/76    (2006.01)
(52) U.S. Cl. ................ 348/231.6; 348/222.1
(58) Field of Classification Search ........... 348/231.2, 348/231.3, 231.6, 222.1; 358/524; 386/121
See application file for complete search history.

(56) References Cited

U.S. PATENT DOCUMENTS

| | | | | |
|---|---|---|---|---|
| 5,309,168 | A * | 5/1994 | Itoh et al. ................ | 345/3.2 |
| 5,903,707 | A * | 5/1999 | Sato et al. ................ | 386/121 |
| 5,943,517 | A | 8/1999 | Sato | |
| 2004/0012694 | A1 | 1/2004 | Sato | |
| 2004/0160521 | A1 | 8/2004 | Yamamoto | |
| 2004/0189819 | A1 * | 9/2004 | Saito ................ | 348/222.1 |

FOREIGN PATENT DOCUMENTS

JP    2002-157163    5/2002

OTHER PUBLICATIONS

English Language Abstract of JP 2002-1571063.
U.S. Appl. No. 11/169,920 to Yamamoto, filed Jun. 30, 2005.

* cited by examiner

*Primary Examiner*—Ngoc-Yen Vu
*Assistant Examiner*—Joel Fosselman
(74) *Attorney, Agent, or Firm*—Greenblum & Bernstein, P.L.C.

(57) ABSTRACT

An image is divided into first and second images, whose pixel data are processed using different processors simultaneously. The pixel data of the first and second image is stored in a first memory field and a second memory field including top and lower fields. The processed data produced from the pixel data of the first image (the first processed data) is stored in the first memory field. The processed data produced from the top line of the second image (the partial processed data) is temporarily stored in a temporary memory field. The processed data produced from the other lines of the second image except for the top line (the second processed data) is stored in the lower field. The partial processed data which is temporarily stored in a temporary memory field is stored in the upper field after the second image processed data has finished being stored.

11 Claims, 6 Drawing Sheets

FIG. 3
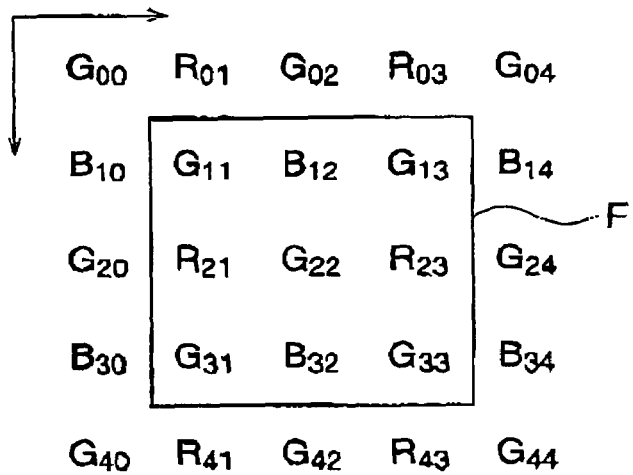
FIG. 4
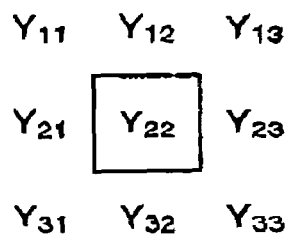
FIG. 5
| $-\frac{1}{8}$ | $-\frac{1}{8}$ | $-\frac{1}{8}$ |
|---|---|---|
| $-\frac{1}{8}$ | 2 | $-\frac{1}{8}$ |
| $\frac{1}{8}$ | $-\frac{1}{8}$ | $-\frac{1}{8}$ |

IMAGE PROCESSING DEVICE

BACKGROUND OF THE INVENTION

1. Field of the Invention

The present invention relates to an image processing device which stores image processed data being produced from pixel data of a color image.

2. Description of the Related Art

An SDRAM (synchronous Dynamic Random Access Memory) which can read and write faster than DRAM has been developed and is conventionally used for processing a color image as shown in Japanese Unexamined Patent Publication (KOKAI) NO. 2002-157163. For example, pixel data of a color image which is produced in a digital camera is stored in the SDRAM temporarily, and the pixel data, which is read from the SDRAM, undergoes image processing so as to produce image processed data.

It is preferable that the SDRAM is as small as possible in order to minimize the digital camera. However, conventionally the SDRAM has the two memory fields for storing both pixel data of the color image and the image processed data, so that it is difficult to reduce a storage capacity of the SDRAM and minimize the SDRAM.

SUMMARY OF THE INVENTION

Therefore, an object of the present invention is to provide an image processing device, which can reduce the storage capacity of the memory such as SDRAM.

According to the present invention, there is provided an image processing device that divides an original image into at least a first image which is located at an upper side and a second image which is located at a lower side with respect to the first image, by using a horizontal line. The image processing device includes a first memory field for storing pixel data forming each line of the first image, a second memory field for storing pixel data forming each line of the second image, and a temporary memory field. The first and second memory fields are formed in a common memory. The second memory field includes a top memory field for storing pixel data of the top line of the second image, and a lower memory field for storing pixel data of other lines of the second image other than the top line. The address of the first memory field at which pixel data of the lowest line of the first image is stored, is adjoined to the address of the second memory field at which pixel data of the highest line of the second image is stored.

The image processing device further has a first and second image processor. The first image processor processes pixel data of the first image from the highest line to the lowest line successively so as to produce first image processed data. The first image processed data is successively stored in the first memory field in each line. The second image processor processes pixel data of the second image from the highest line to the lowest line successively so as to produce partial image processed data and second image processed data. The partial image processed data is obtained by image processing pixel data of the top line of the second image. The second image processed data is obtained by image processing the pixel data of the other lines of the second image. The first and second image processors process the first and second images simultaneously.

The partial image processed data is temporarily stored in the temporary memory field. The second image processed data is successively stored in the lower memory field in each line. The partial image processed data which is stored in the temporary memory field is stored in the upper memory field after the second image processed data has finished being stored in the lower memory field.

The temporary memory field is preferably formed in the common memory, and is preferably a part of a memory field for storing compression data which is obtained by picture compressing the image processed data corresponding to the first and second images. The common memory is preferably SDRAM.

The top line preferably includes more than one line. The first and second image processor preferably performs at least one kind of image process for the pixel data so as to produce the image processed data. In this case, the image processes may include edge enhancement. When the first and second processors perform the image processes on pixel data for the first and second images, the first and second processors use pixel data of pixels which adjoin at least above and below each pixel of the first and second image. Further, the first processor may use the pixel data which is stored in the top memory field.

The image processed data is preferably stored at the same address at which the pixel data corresponding to the image processed data is stored.

According to the present invention, there is provided an image processing method for processing an original image. The image processing method comprises the steps of dividing the original image into at least a first image which is located at an upper side and a second image which is located at a lower side with respect to the first image by a horizontal line, storing the pixel data forming each line of the first image in a first memory field, and storing pixel data forming each line of the second image in a second memory field. The second memory field has a top memory field for storing pixel data of the top line of the second image, and a lower memory field for storing pixel data for the other lines of the second image except for the top line. The first and second memory fields are formed in a common memory. The address of the first memory field at which pixel data of the lowest line of the first image is stored is adjoined to the address of the second memory field at which pixel data of the highest line of the second image is stored.

The image processing method in this invention further comprises the steps of processing pixel data of the first images from the highest line to the lowest line successively so as to produce first image processed data, storing the first image processed data stored in the first memory field in each line successively, and processing pixel data of the second image from the highest line to the lowest line successively and independently, while processing pixel data of the first image, so as to produce partial image processed data which is obtained by image processing pixel data of the top line of the second image and second image processed data which is obtained by image processing pixel data of the other lines of the second image. Further the first and second images are processed simultaneously.

The image processing method in this invention further comprises the steps of temporarily storing the partial image processed data in a temporary memory field, storing a second image processed data in the lower memory field in each line successively, and storing the partial image processed data which is stored in the temporary memory field in the upper memory field after finishing storing the second image processed data in the lower memory field.

BRIEF DESCRIPTION OF THE DRAWINGS

The objects and advantages of the present invention will be better understood from the following description, with reference to the accompanying drawings in which:

FIG. 3 is for explaining pixel interpolation which is performed in the step S2 of the FIG. 2;

FIG. 4 shows luminance data of each pixel surrounded by the frame shown in the FIG. 3;

FIG. 5 shows an operator for performing edge enhancement;

DESCRIPTION OF THE PREFERRED EMBODIMENTS

Figure 1:
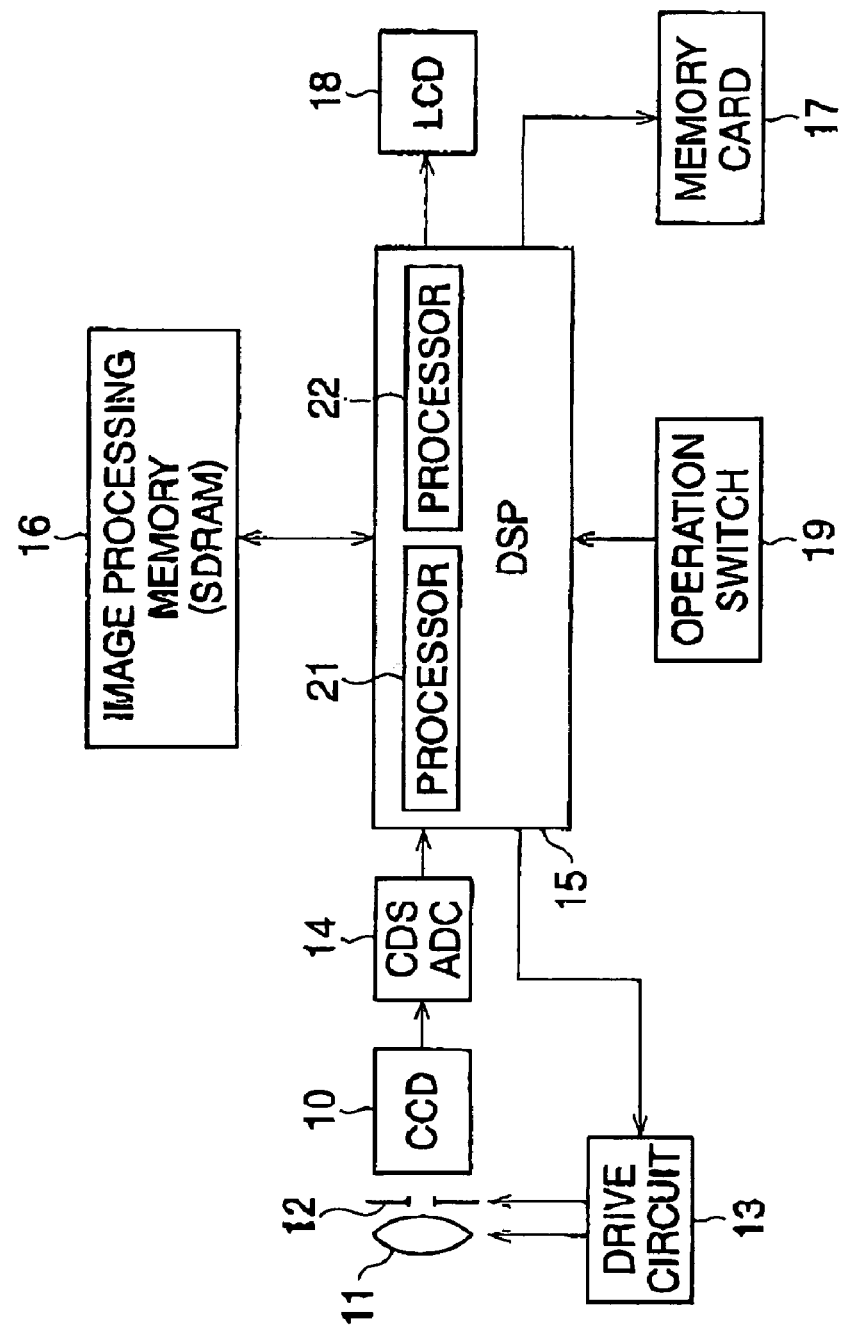
FIG. 1 is a block diagram of the digital camera having an image processing device in an embodiment of this invention.

The present invention will be described below with reference to the embodiments shown in the drawings.

FIG. 1 is a block diagram of a digital camera having an image processing device, as an embodiment of this invention.

An imagine device (CCD) 10 is provided with red (R), green (G) and blue (B) color filters above a light receiving surface thereof. The color filters are arranged according to the Bayer Arrangement. A camera lens 11 and a shutter 12 are provided in front of the light receiving surface. The camera lens 1 and the shutter 12 are driven by a drive circuit 13. Namely, the position of the camera lens 11 for focusing and the open-close movement of the shutter are controlled by the drive circuit 13. When the shutter 12 opens, the light through the camera lens 11 enters the imaging device 10. At the imaging device 10, an image signal which is an analog electric signal corresponding to a second dimension image which is obtained by the camera lens 11, is generated.

The image signal is converted to digital pixel data (raw data) with noise elimination of the image signal, at the analog signal process circuit 14, having a correlated double sampling circuit (CDS) and an analog-to-digital conversion circuit (ADC). The digital pixel data is temporarily stored in an image processing memory (SDRAM) 16 which is connected to a digital signal process circuit (DSP) 15. The digital pixel data is read from the memory 16 and then undergoes many kinds of image processes described in FIG. 2 so as to be converted to image processed data, or undergoes picture compression so as to be converted to JPEG data. The image processed data and the JPEG data are stored in the memory 16.

The JPEG data is read from the memory 16 and then is recorded in a memory card 17. The image processed data is read from the memory 16 and is then displayed on a liquid crystal display device (LCD) 18 as the still color image. Further, the image signal, which is read from the imaging device 10, is input to the LCD 18 directly through the analog signal process circuit 14 and the DSP 15, and then the image signal is displayed on the LCD 18 as a moving image.

The DSP 15 includes two processors (cores) 21 and 22 having the same function. These processors 21 and 22 perform operational processes on the pixel data such as white balance adjustment. The processors 21 and 22 are provided with a buffer memory respectively. The buffers are used in the image processing process descried below.

An operation switch 19, which is connected to the DSP 15, is for operating many workings such as recoding the image processed data in the memory card 17.

Figure 2:
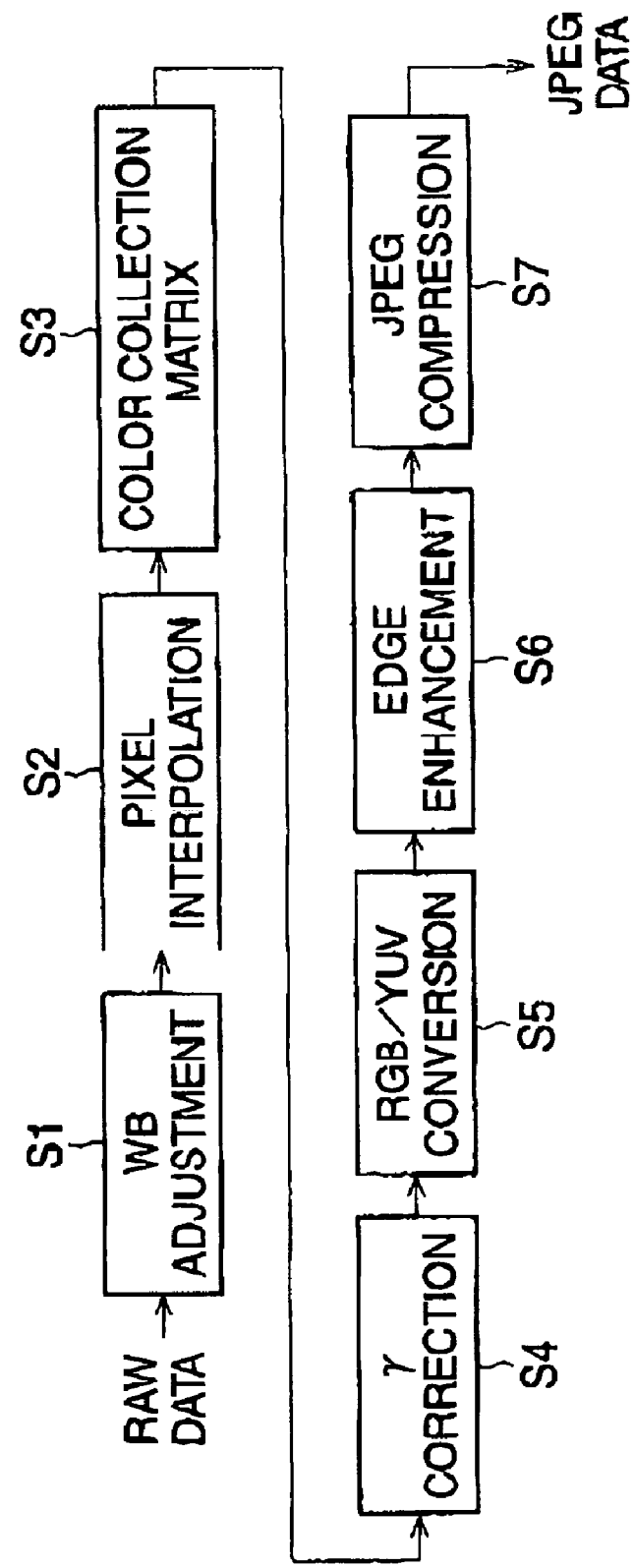
FIG. 2 is a flow chart showing an image processing process which is performed in a digital signal process circuit.

FIG. 2 is a flow chart showing the image processing process which is performed by the processors 21 and 22. At first the pixel data (raw data) undergoes a white balance adjustment at step S1. Next, the pixel data undergoes a pixel interpolation at step 2 in the DSP 15. Namely, each "G" pixel has only "G" pixel data but does not have "R" and "B" pixel data, therefore "R" and "B" pixel data is generated by the pixel interpolation regarding the "G" pixel. Similarly, "G" and "B" pixel data is generated by the pixel interpolation regarding the "R" pixel, and "G" and "B" pixel data is generated by the pixel interpolation regarding the "R" pixel. Due to these, each "R" "G" and "B" pixel can have "R" "G" and "B" pixel data.

At step S3, the pixel data which is obtained by performing processes at step S2 undergoes color correction using a color correction matrix, so that the differences between each pixel data which are generated due to the different properties of the color filters, are eliminated. The pixel data which has undergone color correction undergoes gamma correction at step S4. At step S5, RGB/YUV conversion is performed, so that at step S5, RGB pixel data in each pixel is converted to luminance data (Y) and color difference data (U data (U=B−Y) and V data (V=P−Y)). Namely, the luminance data, U data, and V data are generated for each pixel.

At step S6, the luminance of each pixel undergoes edge enhancement. At step S7, the luminance data, U data, and V data of each pixel undergoes picture compression according to a JPEG algorithm so as to obtain JPEG data.

The pixel interpolation which is performed in step S2 will be explained referring to FIG. 3. In FIG. 3, "R", "G", and "B" letters indicate red, green, and blue respectively. The numbers attached to the "R", "G", and "B" letters indicate a pixel coordinate of the second dimension image which is formed by the pixel data (raw data) inputting to the DSP 15. The origin of the pixel coordinate is (0, 0), at which the "G" pixel is positioned. The positive direction for the horizontal axis is in the right direction, and the positive direction for vertical axis is in the down direction. In the pixel data of the second dimension image, "G" pixels and "R" pixels are alternately arranged on odd numbered lines which are counted from the highest line, and "B" pixels and "G" pixels are alternately arranged on even number lines which are counted from the highest line. For example, $G_{20}$, $R_{21}$, $G_{22}$, $R_{23}$, $G_{24}$, ... are disposed in sequence from left to right, in the third line which is counted from the highest line.

Regarding the "G" pixel, "R" or "B" pixel data is interpolated using the pixel data for the pixels which are adjoined to the "G" pixel at the right and left sides or directly above and below the "G" pixel. For example, the "R" pixel data ($R_{11}$) for the "G" pixel ($G_{11}$) is obtained by calculating the arithmetic average of the pixel data of "R" pixels which are positioned above and below the respective "G" pixel ($G_{11}$) as shown in formula (1).

$$R_{11}=(R_{01}+R_{21})/2 \tag{1}$$

On the other hand, the "B" pixel data ($B_{11}$) for the "G" pixel ($G_{11}$) is obtained by calculating the arithmetic average of the pixel data of "B" pixels which are positioned at the right and left sides with respect to the "G" pixel ($G_{11}$) as shown in formula (2).

$$B_{11}=(B_{10}+B_{12})/2 \quad (2)$$

Regarding the "B" or "R" pixel, "R" or "B" pixel data is obtained by calculating the arithmetic average of four pixels which are adjoined to the "B" or "R" pixel in the oblique direction. For example, "R" pixel data ($R_{12}$) at "B" pixel ($B_{12}$) is calculated according to formula (3).

$$R_{12}=(R_{01}+R_{03}+R_{21}+R_{23})/4 \quad (3)$$

Further, "B" pixel data ($B_{21}$) for "R" pixel ($R_{21}$) is calculated according to formula (4).

$$B_{21}=(B_{10}+B_{12}+B_{30}+B_{22})/4 \quad (4)$$

On the other hand, "G" pixel data at the "B" and "R" pixel is interpolated using the pixel data at the pixels which are adjoined to the "B" or "R" pixel at the right and left, and above and below. For example, the "G" pixel data ($G_{12}$) for the "B" pixel ($B_{12}$) is obtained by calculating an arithmetic average of the pixel data of "G" pixels which are positioned at the left and right, and above and below with respect to the "B" pixel ($B_{12}$) as shown in formula (5).

$$G_{12}=(G_{02}+G_{11}+G_{22}+G_{13})/4 \quad (5)$$

The edge enhancement which is performed at step S6 shown in FIG. 2 will be explained referring to FIGS. 4 and 5. The edge enhancement is performed for the luminance data described above. FIG. 4 shows luminance data $Y_{11}$-$Y_{33}$ of the 3×3 pixels surrounded by a frame F shown in FIG. 3. FIG. 5 shows an operator (filter matrix) for performing the edge enhancement. As shown in FIG. 5, the calculation using formula (6) is done, so that the pixel of luminance data $Y_{22}$ undergoes the edge enhancement for example.

$$2 \times Y_{22}-(1/8) \times (Y_{11}+Y_{12}+Y_{13}+Y_{21}+Y_{23}+Y_{31}+Y_{32}+Y_{33}) \quad (6)$$

The 16 pixels (such as $G_{00}$, $R_{01}$, $G_{02}$, ...) surrounding the frame F are not sufficient to perform edge enhancement for all 3×3 pixels surrounded by the frame F. For example, in order to perform the edge enhancement for the "G" pixel ($G_{11}$), "G" pixel data of all 8 pixels which surround the "G" pixel ($G_{11}$) is needed. However, it is impossible to obtain "G" pixel data (namely luminance data) for pixel $R_{01}$ and pixel $B_{10}$, if only using the pixel data of the pixels which are shown in FIG. 3. Therefore, it is impossible for the "G" pixel ($G_{11}$) to undergo edge enhancement if only using the pixel data of the pixels which are shown in FIG. 3. In other words, the edge enhancement which is performed for one pixel requires at least two pixels surrounding that one pixel. Therefore, in the case of the image consisting of the pixels in FIG. 3, it is possible to perform the edge enhancement only to "G" pixel ($G_{22}$).

As described above, the edge enhancement of the two dimension image demands not only the pixel data of the pixels of the two dimension image but also the pixel data for each pair of pixels which are adjoined to the two dimension image at the left and right sides, and above and below. Such pixels which are adjoined to the two dimension image are called "ring pixels". Therefore, if the number of pixels is "H" in the horizontal direction and the number of pixels is "V" in the vertical direction, in the two dimension image, pixel data of (H+4) pixels×(V+4) pixels is needed in order to perform the edge enhancement of the two dimension image. In other words the image processed data of the two dimension image is obtained using pixel data in ring pixels surrounding the two dimension image as well as using pixel data of the two dimension image.

In this embodiment, the processors 21 and 22 having the same function are provided in the DSP 15 as described above. Namely, an image (original image) is divided into two partial images (first and second images), the pixel data of each partial image is read from the memory 16. And the pixel data of each partial image is simultaneously processed by the processors 21 and 22 respectively and then is stored in the memory 16. Next, the pixel data and the image processed data will be explained when stored in the memory 16, referring to FIGS. 6-10.

Figure 6:
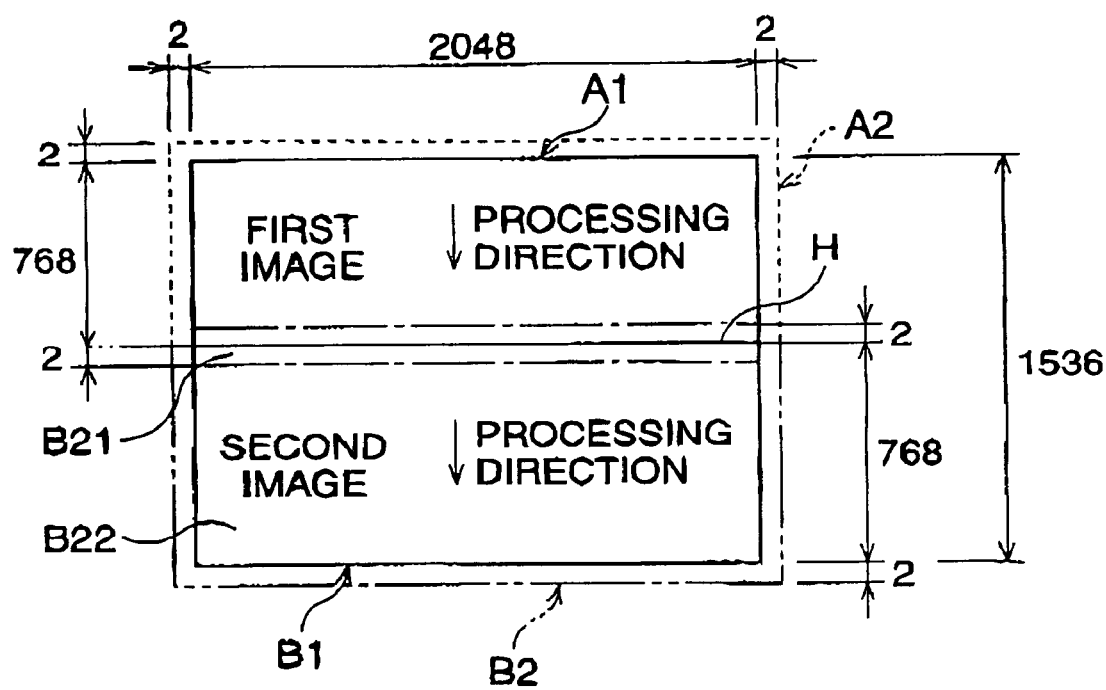
FIG. 6 shows how pixel data is stored in an image processing memory.
Figure 7:
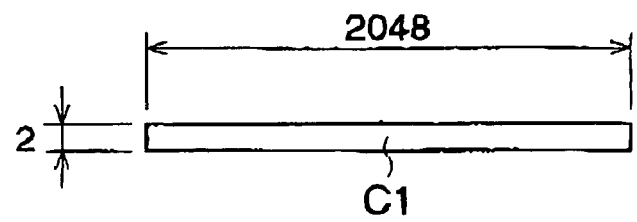
FIG. 7 shows a temporary field.

Hereinafter, it is presumed that the number of pixels is "2048" in the horizontal direction and the number of pixels is "1536" in the vertical direction in the two dimension image. As shown in FIG. 6, the original image is divided into the first image which is located at an upper side and the second image which is located at a lower side by using a horizontal line H passing between $768^{th}$ lines and $769^{th}$ lines which are counted from the highest line (the $1^{st}$ line). In the image processing process, four pixels in each horizontal line and vertical columns besides the pixels of the two dimension image are needed. Therefore, the pixel data of 2052×1540 pixels is stored in the memory 16.

The first image pixel data (of 2048 pixels×768 pixels) (symbol A1 in FIG. 6) which is composed of pixel data for each line of the first image and pixel data for the ring pixels which are located on the left, above, and on the right side of the first image is stored in a first memory field A2. Namely, the first memory field A2 is the field surrounded by a broken line which is located above the horizontal line H. Similarly, the second image pixel data (of 2048 pixels×768 pixels) (symbol B1 in FIG. 6) which is composed of pixel data for each line of the second image and the ring pixels which are located on the left, below, and on the right side of the second image in stored in a second memory field B2. Namely, the second memory field B2 is the field surrounded by a two point chain line which in located below the horizontal line H.

The first memory field A2 and the second memory field S2 are formed in the memory 16, namely in a common memory. And, the address of the first memory field A2 at which pixel data of the lowest line of the first image is stored is adjoined to the address of the second memory field B2 at which pixel data of the highest line of the second image is stored.

The second memory field B2 has a top memory field B21 for storing pixel data of the two top lines of the second image, and a lower memory field B22 for storing pixel data of the other 768 lines of the second image, the lines other than the two top lines. In the image processing progress, the pixel data stored in a top memory field B21 and pixel data stored in the lower memory field B22 is processed independently.

In the image processing process, the first and second images are processed from the highest line to the lowest line respectively. In the first process, the highest line in the first image is processed. Namely, the pixel data is read from five lines from the first line (the highest line) to the fifth line in the first memory field A2. The pixel data of these five lines is temporarily stored in the buffer memory in the processor 21. Using the pixel data of these five lines stored in the buffer memory, the pixel data of the highest line in the first image undergoes the image processes from step S1 to step S6 as shown in FIG. 3, and then is stored at a third line address from the highest line in the first memory field A2 (namely, the highest line in the first image) as the image processed data. Namely, the address at which the image processed data is stored is the same address at which the pixel data corresponding to that image processed data was stored.

The highest line in the second image is processed simultaneously with processing of the highest line in the first image.

Namely, the pixel data of the two lowest lines in the first image is read from the first memory field A2 and the pixel data of the three highest lines in the second image is read from the second memory field B2. The pixel data of these five lines is temporarily stored in the buffer memory in the processor 22. Using the pixel data of these five lines, stored in the buffer memory in the processor 22, the pixel data of the highest line in the second image undergoes the image processes from step S1 to step S6 as shown in FIG. 3 so as to produce the image processed data. And then the image processed data is stored at the first line address in a temporary memory field C1 (referring to FIG. 7). Therefore, the pixel data of the first line in the second memory field B2 of the second image is not overwritten and remains to be used for calculating the image data of the second to lowest and lowest line of the first image. The temporary memory field C1 is formed in the memory 16, but this field C1 is a different field from the first and second fields A2 and B2.

In the second process, the second highest line in the first image is processed. Namely, the pixel data of the first line of the first memory field A2 in the buffer memory is deleted, and then the pixel data of the sixth line which is deleted from the highest line (the first line) is read from the first memory field A2 and is stored in the buffer memory. Using the pixel data of five lines from the second line to the sixth line of the memory field A2 in the buffer memory, the pixel data of the second highest line in the first image undergoes the image processes from step S1 to step S6 so as to produce the image processed data. The image processed data is stored at the forth line address from the highest line in the first memory field A2 (namely, the second highest line in the first image).

The second highest line in the second image is processed simultaneously with the processing of the second highest line in the first image. Namely, the pixel data of the second lowest line of the first image in the buffer memory is deleted, and then the pixel data of the fourth highest line in the second image is read from the second memory field B2 and is stored in the buffer memory. Using the pixel data of five lines in the buffer memory (namely, the pixel data of the lowest line in the first image and the four highest lines in the second image), the pixel data of the second highest line in the second image undergoes the image processes and is then stored at the second line address in a temporary memory field C1 as the image processed data. Therefore, the pixel data of the second to highest line in the second memory field B2 of the second image is not overwritten and can be used to calculate the image data for the lowest line of the first image.

In the third process, the third highest line in the first image is processed. Namely, the pixel data of the second line of the first memory field A2 in the buffer memory is deleted, and then the pixel data of the seventh line which is counted from the highest line is read from the first memory field A2 and is stored in the buffer memory. Using the pixel data of five lines from the third line to the seventh line of the first memory field A2 in the buffer memory, the pixel data of the third highest line in the first image undergoes the image processes so as to produce the image processed data. The image processed data is stored at the fifth line address from the highest line in the first memory field A2 (namely, the third highest line in the first image).

The third highest line in the second image is processed simultaneously with the processing the third highest line in the first image. Namely, the lowest line of the first image in the buffer memory is deleted, and then the pixel data of the fifth highest line in the second image is read from the second memory field B2 and is stored in the buffer memory. Using the pixel data of the five highest lines of the second image in the buffer memory, the pixel data of the third highest line in the second image undergoes the image processes and is then stored at the third line address from the highest line in the second memory field B2 (lower memory field D22) as the image processed data, hence the original image data is overwritten.

As described above, the image processed data is not stored at the first and second line addresses from the highest line in the second memory field B2 (namely not stored in the upper memory field B21). Therefore, the pixel data (raw data) is still stored at the first and second line addresses in the second memory field B2.

At the later processes, the image processed data regarding each line from the forth line to the lowest line in the first image is produced successively and is then successively stored from the sixth line address to the lowest line address in the first memory field A2. Simultaneously with these processes, the image processed data regarding each line from the fourth line to the lowest line in the second image is produced successively and is then successively stored from the forth line address to the lowest line address in the second memory field B2 (lower memory field B22).

In this embodiment, the pixel data from the third highest line to the lowest lines in the second image have already been lost from the lower memory field B22, because the image processed data is overwritten on the pixel data. However, the pixel data of the top lines in the second image (namely the highest and second highest lines) has not been lost from the upper memory field B21 yet, because the image processed data of the top lines is not stored in the upper memory field B21 but stored in the temporary field C1.

As described above, five lines are needed for processing pixel data or one line from step S1 to step S6. Therefore, when the image processed data regarding the second lowest and the lowest line in the first image is produced, the pixel data of the highest line and/or the second highest line in the second image is needed. In this embodiment, the pixel data of those lines has not been lost yet, therefore the image processed data regarding the second lowest and the lowest line in the first image can be produced. Due to this, all pixel data in the first image undergoes the image processes of steps S1-S6 so that all image processed data regarding the first image can be obtained.

Due to this, the image processed data regarding the first image (the first image processed data) is successively stored in the first memory field A2 in each line. On the other hand, the image processed data regarding the pixel data of the top two lines in the second image (the partial image processed data) is stored in the temporary memory field C1. And the image processed data regarding the pixel data or the other lines of the second image except for the top two lines (the second image processed data) is successively stored in the second memory field B22 in each line.

Figure 8:
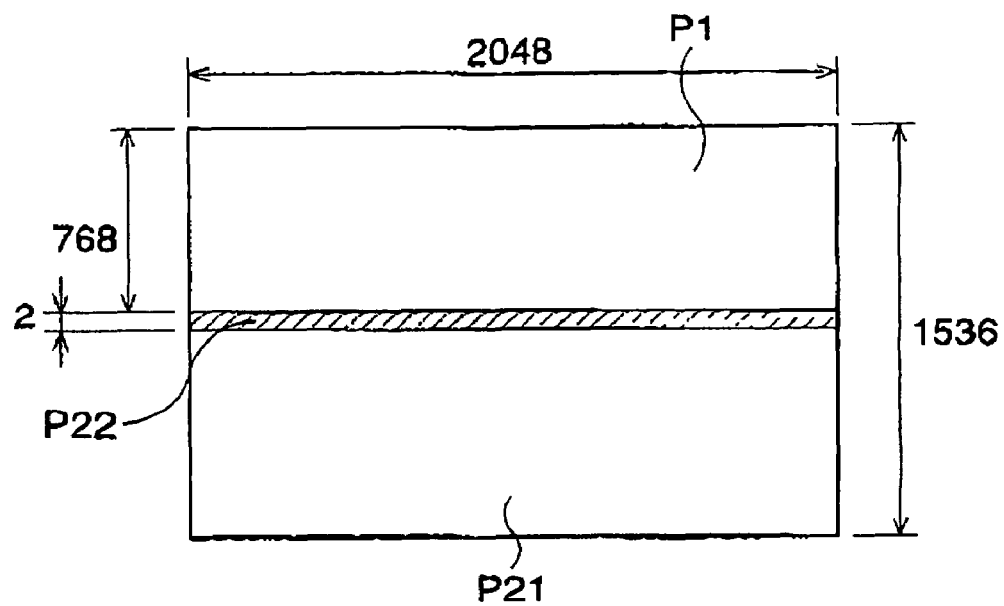
FIG. 8 is an outline, showing the image processing memory for storing image processed data of a first image and image processed data of a lower image of a second image except for the top part 2 lines.

Namely, as shown in FIG. 8, the first image processed data of the first image P1 (2048 pixels×768 pixels) and the second image processed data of the lower image P21 which is the second image other than the top two lines is stored in the memory 16 (the first field A1 and the lower memory field B22) On the other hand, the partial image processed data of the top image P22 which is top two line image in the second image is stored in the temporary field C1.

After the first and second image processed data has finished being stored in the first field A1 and the lower memory field B22, the partial image processed data which is temporarily stored in the temporary memory C1 is stored in the upper memory field B21. Due to this, the image processed data is stored at same address at which the pixel data (raw data having 2048 pixels×1536 pixels) corresponding to the image processed data, is stored in the first and second memory fields A2 and B2.

Figure 9:
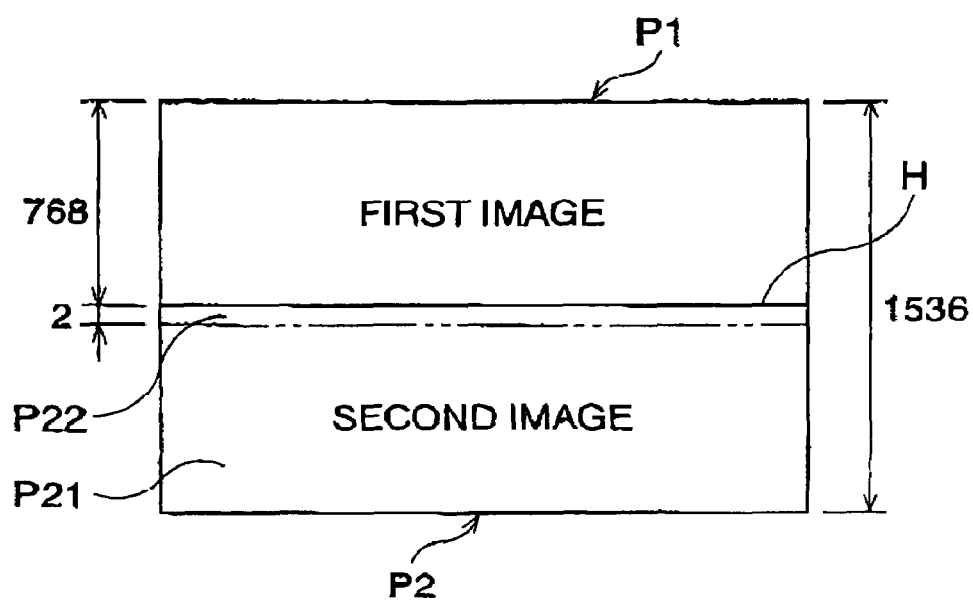
FIG. 9 shows the image processed data when the image processed data is replayed on a liquid crystal display device.

Therefore, when the image processed data which is stored in the first and second memory fields A2 and B2 is read according to the address order and then is replayed using the LCD 18, the image which is composed by combining the first image P1 and the second image P2 consisting of the top image P22 and the lower image P21 is displayed on the LCD 18 as shown in FIG. 9.

Figure 10:
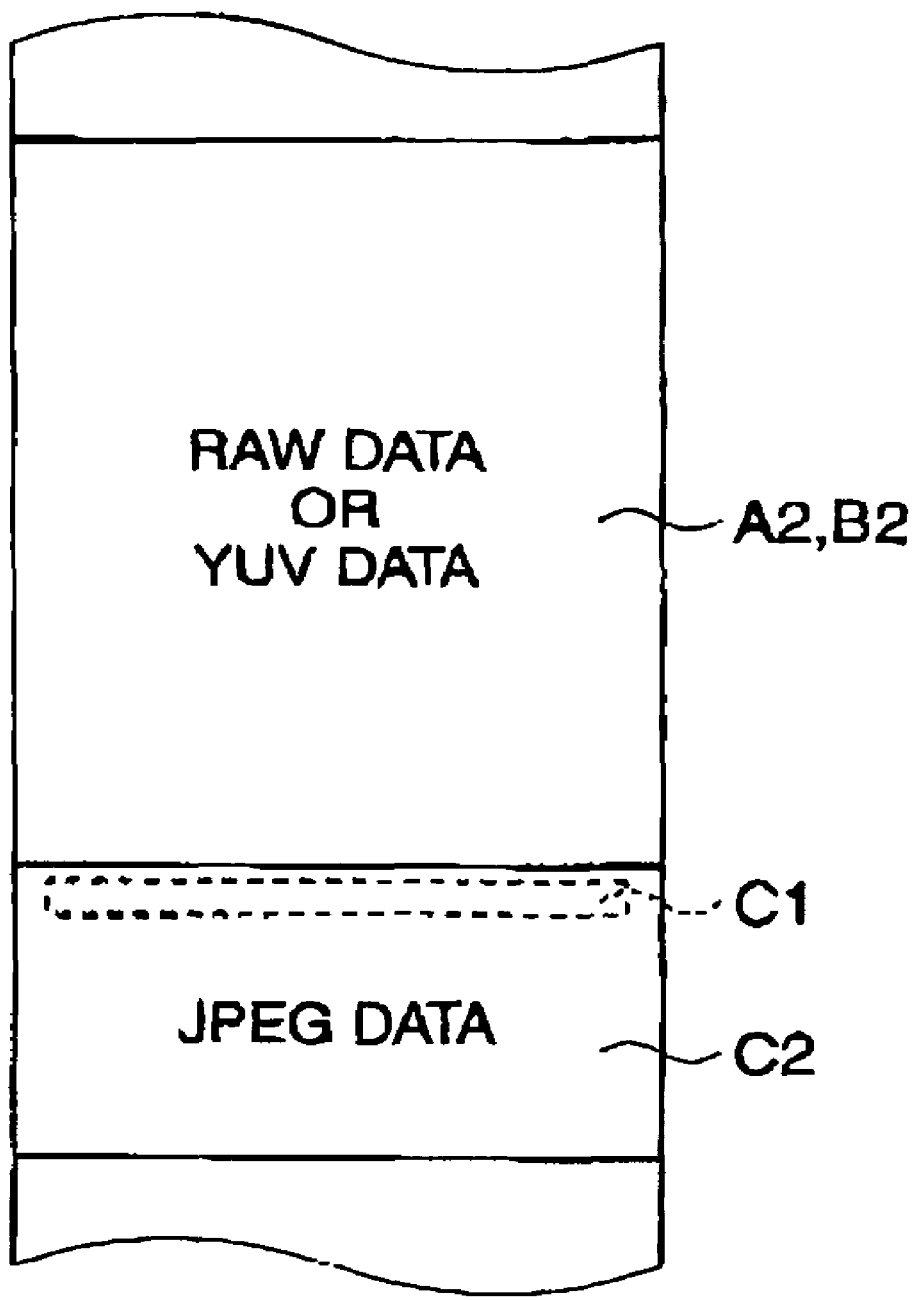
FIG. 10 is a structure of the image processing memory.

FIG. 10 shows is a structure of the memory 16. The memory 16 has the first and second memory fields A2 and B2, and a compression image memory field C2. The second memory fields A2 and B2 are the memory fields for storing the pixel data (raw data) or the image processed data which is Y data, U data, and V data. The compression image memory field C2 is the memory field for storing the compression image data (JPEG data) which is obtained by image compression of the image processed data corresponding to the first and second image. The temporary field C1 is a part of the compression image memory field C2.

As described above, in this embodiment, the image processed data which is obtained by processing pixel data of the top two lines in the second image, is stored in the temporary field C1 temporarily. Next, this image processed data which is stored in the temporary field C1, is stored in the top memory field B21 after storing the image processed data in the first memory field A2 and the lower memory field B22. Due to this, all pixel data in the one original image undergoes image processes. Therefore the displayed image does not have any lines which consist of the pixel data that has not undergone the image processes in the center of the displayed image.

Further, in this embodiment, the image process is performed respectively for the two partial images which are obtained by dividing one original image, by the first and second processors 21 and 22 simultaneously. And the field for temporarily storing the top image processed data in the second image is provided in the memory 16. Accordingly, the memory 16 does not have to keep the pixel data and the image processed data. Due to this, the storage capacity of the memory 16 can be reduced and the image processing device can be minimized.

In this embodiment, the raw data is composed of the pixel data in the two dimension image and the pixel data of each pair of pixels which is adjoined to the two dimension image at left and right sides and above and below. However, the raw data can be composed of the pixel data in the two dimension image and the pixel data of three or four pixels which are adjoined to the two dimension image at the left and right side and above and below. In this case, the storage capacity of the temporary field C1 is determined to be three or four lines according to the width of the ring pixels.

In addition, the number of the divisions of the original image is not limited to two, therefore this invention can be applied when the original image is divided into four partial images for example.

Although the embodiments of the present invention have been described herein with reference to the accompanying drawings, obviously many modifications and changes maybe made by those skilled in this art without departing from the scope of the invention.

The present disclosure relates to subject matter contained in Japanese Patent Application No. 2004-195178 (filed on Jul. 1, 2004) which is expressly incorporated herein, by reference, in its entirety.

The invention claimed is:

1. An image processing device that divides an original image into at least a first image which is located at an upper side and a second image, which is located at a lower side with respect to said first image by using a horizontal line, said image processing device comprising:
    a first memory field for storing pixel data forming each line of said first image,
    a second memory field for storing pixel data forming each line of said second image, that comprises a top memory field for storing pixel data of the top line of said second image, and a lower memory field for storing pixel data of other lines of said second image other than said top line, said first and second memory fields being formed in a common memory, an address of said first memory field at which pixel data of the lowest line of said first image is stored, being adjoined to an address of said second memory field at which pixel data of the highest line of said second image is stored,
    a temporary memory field,
    a first image processor that processes pixel data of said first image from the highest line to the lowest line successively so as to produce first image processed data, said first image processed data being successively stored in said first memory field in each line, and
    a second image processor that processes pixel data of said second image from the highest line to the lowest line successively so as to produce partial image processed data which is obtained by image processing pixel data of said top line of said second image, and second image processed data which is obtained by image processing the pixel data of said other lines of said second image, said first and second image processors processing said first and second images simultaneously, said partial image processed data being temporarily stored in said temporary memory field, and said second image processed data being successively stored in said lower memory field in each line;
    wherein said partial image processed data which is stored in said temporary memory field is stored in said upper memory field after said second image processed data has finished being stored in said lower memory field.

2. An image processing device according to claim 1, wherein said temporary memory field is formed in said common memory.

3. An image processing device according to claim 1, wherein said temporary memory field is a part of a memory field for storing compression data which is obtained by compressing said image processed data corresponding to said first and second images.

4. An image processing device according to claim 1, wherein said common memory is SDRAM.

5. An image processing device according to claim 1, wherein said top line includes more than one line.

6. An image processing device according to claim 1, wherein said first and second image processors perform one or more than one kind of image process on said pixel data so as to produce said image processed data.

7. An image processing device according to claim 6, wherein one of said image processes is edge enhancement.

8. An image processing device according to claim 6, wherein when said first and second processors perform said image processes on pixel data for said first and second images, said first and second processors use pixel data of pixels which adjoin at least above and below each pixel of said first and second image.

9. An image processing device according to claim 1, wherein said first processor uses said pixel data which is stored in said top memory field.

10. An image processing device according to claim 1, wherein said image processed data is stored at a same address at which said pixel data corresponding to said image processed data is stored.

11. An image processing method for processing an original image, comprising the steps of:
- dividing said original image into at least a first image which is located at an upper side and a second image which is located at a lower side with respect to said first image by a horizontal line,
- storing pixel data forming each line of said first image in a first memory field,
- storing pixel data forming each line of said second image in a second memory field, that comprises a top memory field for storing pixel data of the top line of said second image, and a lower memory field for storing pixel data for the other lines of said second image other than said top line, said first and second memory fields being formed in a common memory, an address of said first memory field at which pixel data of the lowest line of said first image is stored being adjoined to an address of said second memory field at which pixel data of the highest line of said second image is stored,
- processing pixel data of said first image from the highest line to the lowest line successively so as to produce first image processed data,
- storing said first image processed data stored in said first memory field in each line successively,
- processing pixel data of said second image from the highest line to the lowest line successively, and independently of processing pixel data of said first image, so as to produce partial image processed data which is obtained by image processing pixel data of said top line of said second image and second image processed data which is obtained by image processing pixel data of said other lines of said second image, whereby said first and second images are processed simultaneously,
- temporarily storing said partial image processed data in a temporary memory field,
- storing a second image processed data in said lower memory field in each line successively, and
- storing said partial image processed data which is stored in said temporary memory field in said upper memory field after finishing storing said second image processed data in said lower memory field.

* * * * *